US012738788B2

(12) United States Patent
Bourniche et al.

(10) Patent No.: US 12,738,788 B2
(45) Date of Patent: Sep. 15, 2026

(54) SYSTEMS AND METHODS FOR DIRECT WINDING HEAT EXCHANGER IN MOTOR

(71) Applicant: BorgWarner US Technologies LLC, Wilmington, DE (US)

(72) Inventors: Eric Bourniche, Preutin-Higny (FR); Pascal David, Luxembourg (LU)

(73) Assignee: BorgWarner US Technologies LLC, Wilmington, DE (US)

(*) Notice: Subject to any disclaimer, the term of this patent is extended or adjusted under 35 U.S.C. 154(b) by 179 days.

(21) Appl. No.: 18/434,144

(22) Filed: Feb. 6, 2024

(65) Prior Publication Data

US 2025/0253729 A1 Aug. 7, 2025

(51) Int. Cl.

*H02K 3/24* (2006.01)
*H02K 1/20* (2006.01)
*H02K 1/32* (2006.01)
*H02K 15/021* (2025.01)

(52) U.S. Cl.

CPC ................ *H02K 3/24* (2013.01); *H02K 1/20* (2013.01); *H02K 1/32* (2013.01); *H02K 15/021* (2025.01); *H02K 2215/00* (2021.08)

(58) Field of Classification Search

CPC ............ H02K 3/24; H02K 1/32; H02K 1/325; H02K 9/19; H02K 9/193; H02K 9/197

See application file for complete search history.

(56) References Cited

U.S. PATENT DOCUMENTS 3,261,995 A 7/1966 Kohn
2010/0102651 A1* 4/2010 Mohle ...................... H02K 3/24 310/54
2014/0265660 A1 9/2014 Kulkarni et al.
2017/0194838 A1 7/2017 Marvin et al.
2022/0337125 A1* 10/2022 Dang ...................... H02K 9/22

FOREIGN PATENT DOCUMENTS

CN 112332568 A 2/2021
CN 116896197 A 10/2023
DE 102021126697 A1 * 4/2023 ........... H02K 15/023
DE 10 2022 203 783 A1 10/2023

OTHER PUBLICATIONS

Lang (DE 102021126697 A1) English Translation (Year: 2023).*

* cited by examiner

*Primary Examiner* — Tulsidas C Patel
*Assistant Examiner* — Robert E Mates
(74) *Attorney, Agent, or Firm* — Joshua M. Haines; Bookoff McAndrews, PLLC

(57) ABSTRACT

A system includes a rotor core; a rotor stack extending circumferentially from the rotor core, the rotor stack including: a first end; a second end opposite to the first end; and a first slot in the rotor stack, the first slot extending from the first end to the second end; and a hairpin cooling pipe in the first slot of the rotor stack.

17 Claims, 8 Drawing Sheets

SYSTEMS AND METHODS FOR DIRECT WINDING HEAT EXCHANGER IN MOTOR

TECHNICAL FIELD

Various embodiments of the present disclosure relate generally to a heat exchanger system, and, more particularly, to systems and methods for a direct winding heat exchanger using a porous layered tube.

INTRODUCTION

Thermal management is considered a key technical aspect in a vehicle system. Improving thermal management of component of a vehicle, such as a motor, may improve performance and reliability of the vehicle. An electric motor may refer to components such as an eMachine, stator, or a rotor. Some systems may cool a motor at an outermost layer. However, the hottest areas of the motor may be located internally.

The present disclosure is directed to overcoming one or more of these above-referenced challenges.

SUMMARY OF THE DISCLOSURE

In some aspects, the techniques described herein relate to a system, the system including a rotor core; a rotor stack extending circumferentially from the rotor core, the rotor stack including: a first end; a second end opposite to the first end; and a first slot in the rotor stack, the first slot extending from the first end to the second end; and a hairpin cooling pipe in the first slot of the rotor stack.

In some aspects, the techniques described herein relate to a system, wherein the hairpin cooling pipe includes: a first elongated portion; a second elongated portion parallel to the first elongated portion; and a U-shaped connector connecting the first elongated portion to the second elongated portion.

In some aspects, the techniques described herein relate to a system, further including: a second slot extending from the first end of the rotor stack to the second end of the rotor stack; wherein the first slot of the rotor stack is configured to receive the first elongated portion of the hairpin cooling pipe and the second slot of the rotor stack is configured to receive the second elongated portion of the hairpin cooling pipe.

In some aspects, the techniques described herein relate to a system, further including: an inlet circuit extending circumferentially around the first end of the rotor stack; and an outlet circuit extending circumferentially around the first end of the rotor stack.

In some aspects, the techniques described herein relate to a system, wherein the first elongated portion of the hairpin cooling pipe is fluidly connected to the inlet circuit and the second elongated portion of the hairpin cooling pipe is fluidly connected to the outlet circuit.

In some aspects, the techniques described herein relate to a system, further including: a pump, a filter; and a heat exchanger, wherein the pump, the filter, and the heat exchanger are fluidly connected to the inlet circuit of the rotor stack.

In some aspects, the techniques described herein relate to a system, further including: a sump, wherein the sump is fluidly connected to the outlet circuit of the rotor stack.

In some aspects, the techniques described herein relate to a system, wherein the rotor stack includes a first lamination and a second lamination, the first slot extends through the first lamination and the second lamination, and the hairpin cooling pipe is provided in the first slot in the first lamination and the second lamination.

In some aspects, the techniques described herein relate to a system, further including: a stator, wherein the rotor core and the rotor stack are provided inside the stator, wherein the system is provided as a vehicle including the stator, the rotor core, and the rotor stack.

In some aspects, the techniques described herein relate to a system including a stator, the stator including, an outer cylinder; a core within the outer cylinder, the core including a lamination stack, the lamination stack including: a first end; a second end opposite to the first end; and a first slot in the lamination stack, the first slot extending from the first end to the second end; and a hairpin cooling pipe in the first slot of the lamination stack.

In some aspects, the techniques described herein relate to a system, wherein the hairpin cooling pipe includes: a first elongated portion; a second elongated portion parallel to the first elongated portion; and a U-shaped connector connecting the first elongated portion to the second elongated portion.

In some aspects, the techniques described herein relate to a system, the stator further including: a second slot extending from the first end of the lamination stack to the second end of the lamination stack; wherein the first slot of the lamination stack is configured to receive the first elongated portion of the hairpin cooling pipe and the second slot of the lamination stack is configured to receive the second elongated portion of the hairpin cooling pipe.

In some aspects, the techniques described herein relate to a system, further including: an inlet circuit extending circumferentially around the stator; and an outlet circuit extending circumferentially around the stator.

In some aspects, the techniques described herein relate to a system, wherein the first elongated portion of the hairpin cooling pipe is fluidly connected to the inlet circuit and the second elongated portion of the hairpin cooling pipe is fluidly connected to the outlet circuit.

In some aspects, the techniques described herein relate to a system, wherein, further including: a pump, a filter; and a heat exchanger, wherein the pump, the filter, and the heat exchanger are fluidly connected to the inlet circuit of the stator.

In some aspects, the techniques described herein relate to a system, wherein, further including: a sump, wherein the sump is fluidly connected to the outlet circuit of the stator.

In some aspects, the techniques described herein relate to a system, wherein, wherein the lamination stack includes a first lamination and a second lamination, the first slot extends through the first lamination and the second lamination, and the hairpin cooling pipe is provided in the first slot in the first lamination and the second lamination.

In some aspects, the techniques described herein relate to a system, further including: a rotor, wherein the rotor is provided inside the stator.

In some aspects, the techniques described herein relate to a method of assembling a cooling circuit, the method including: depositing an insulation layer on an outer surface of a tube; performing an induction method on an inner surface of the tube to form deposits; reshaping the tube to have a rectangular cross section; reshaping the tube to a hairpin shape, as a hairpin shaped tube; and assembling the hairpin shaped tube into a slot of one or more of a rotor or a stator.

In some aspects, the techniques described herein relate to a method, wherein assembling the hairpin shaped tube further includes: inserting a first elongated portion of the hairpin shaped tube into a first slot of a lamination stack; and inserting a second elongated portion of the hairpin shaped tube into a second slot of the lamination stack, wherein the first elongated portion of the hairpin shaped tube is parallel to the second elongated portion of the hairpin shaped tube and connected to the second elongated portion by a U-shaped connector.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
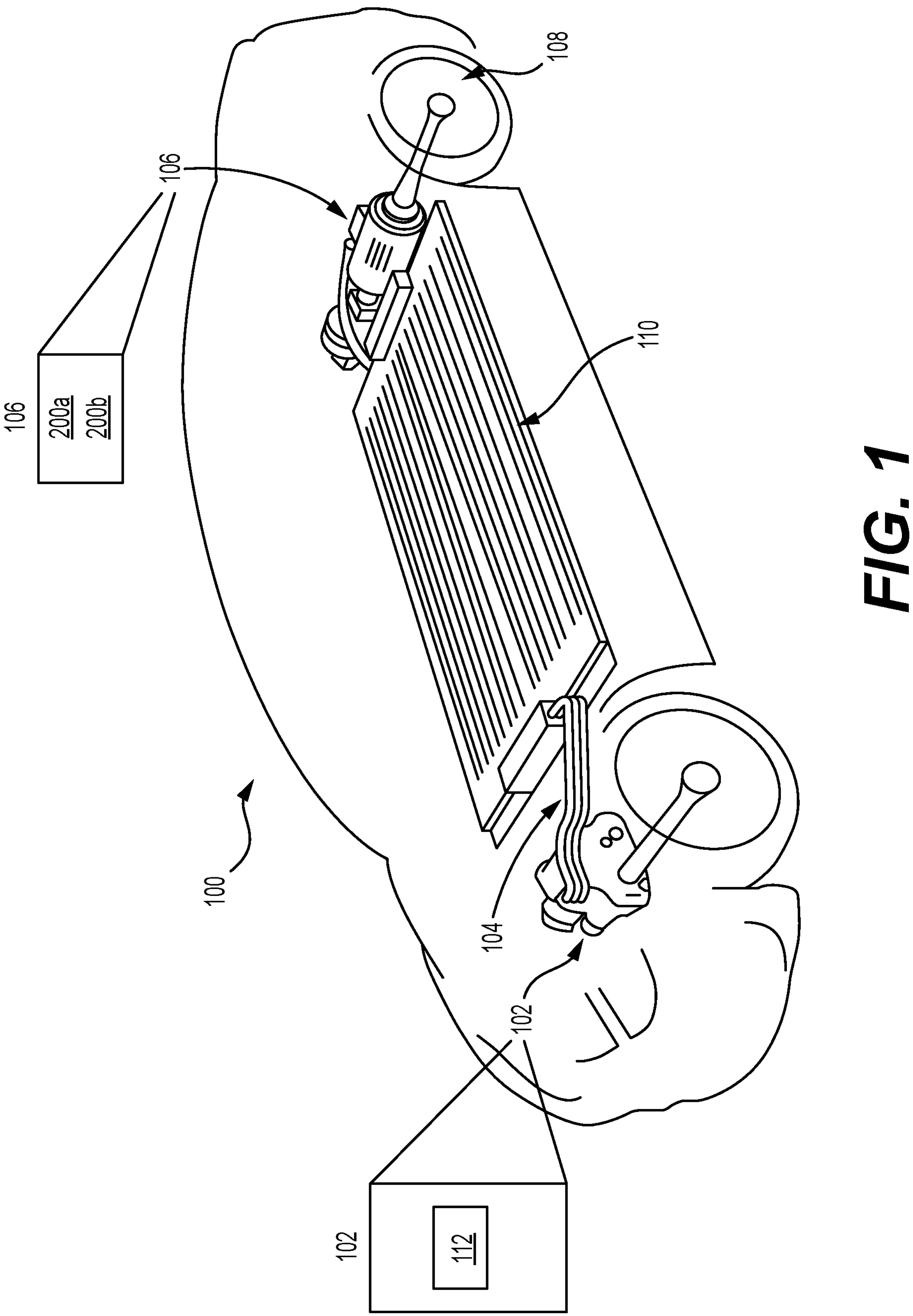
FIG. 1 depicts an exemplary system infrastructure for a vehicle including an inverter, according to one or more embodiments.

Both the foregoing general description and the following detailed description are exemplary and explanatory only and are not restrictive of the features, as claimed. As used herein, the terms “comprises,” “comprising,” “has,” “having,” “includes,” “including,” or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, “about,” “substantially,” and “approximately” are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Various embodiments of the present disclosure relate generally to a heat exchanger system, and, more particularly, to systems and methods for a direct winding heat exchanger using a porous layered tube.

An electric vehicle (EV) or hybrid electric vehicle (HEV) may include an electric motor. An electric motor may be configured to convert electrical energy into mechanical energy. Electric motors may include components such as a stator and a rotor configured to rotate within the stator. The stator may create a magnetic field that interacts with the rotor, causing the rotor to spin. The rotational motion may then be utilized to drive a system. Exemplary electric motors include AC motors, DC motors, and stepper motors.

Motor components may have high operating temperatures when in use. The performance, assembly process and time, and reliability of the motor may all be dependent on a built-in coolant structure. Cooling structures of a motor may improve performance and reliability of a vehicle.

Some systems may include a cooling system (e.g., a jacket) disposed on an outer surface of a motor. The motor may have highest temperatures internally towards a center of the component when in use. Therefore, an externally-located cooling jacket may not efficiently cool a motor, as the cooling jacket contacts the least heated portion of the motor.

Some systems may utilize water-soluble thermoplastics such as polyvinyl alcohol to produce direct windings for cooling a motor. These direct windings may be placed within the eMachine. The direct windings may be produced with 3D-printers or by injection molding. However, water-soluble molded parts may have a limited cooling performance.

Some systems may incorporate direct winding cooling by utilizing 3D printed heat exchangers made of copper. These 3D printed systems may include complex shapes for turbulent flow and for a high heat exchange surface, and may be challenging to produce. The 3D printed systems may also include issues such as assembly complexity, increased manufacturing costs, and decreased cooling performance of the e-machine.

One or more embodiments may include a hairpin cooling tube inserted in a slot with a winding of an e-machine to dissipate heat from internal components of a motor (e.g., a stator or a rotor). The winding may further included flattened rectangular wires. The flattened rectangular wires may increase the copper filling factor of a winding in a motor, while the hairpin cooling tube may increase the cooling performance of a motor (and thus increase continuous torque and power output).

One or more embodiments may be configured to increase cooling efficiency by providing a coolant device close to a component that generates heat within the motor (i.e., in the windings of a motor). For example, the heat exchanger (e.g., the hairpin shaped tube) is close to the heat generation component (copper windings), which may provide a motor with a high peak/continuous performance ratio.

One or more embodiments may include a hairpin shaped tube within a slot of a motor. The hairpin shaped tube may include a porous inner surface. The porous inner surface may increase the level of heat exchange performance, by increasing the heat transfer coefficient due to the turbulent flow created within the hairpin shaped tube.

One or more embodiments may include a large heat exchange area within small pipes, enabling the system to be compact. This may lead to lower motor outer diameter compared to some systems. The system described herein may further include a low motor cycle temperature (at a given flow), which may provide better cycle efficiency (due to reduced copper losses). One or more embodiments may cool a stator and/or rotor. The slots within the motor may further include automatic transmission fluid (ATF) or water-ethylene glycol (WEG) configured to further cool motor windings.

FIG. 1 depicts an exemplary system infrastructure for a vehicle including an inverter, according to one or more embodiments. Electric vehicle 100 may include inverter 102, connectors 104, drive motor 106, wheels 108, and battery 110. The inverter 102 may include power module 112. Connectors 104 may connect the inverter 102 and battery 110. Inverter 102 may include components to receive electrical power from an external source and output electrical power to charge battery 110 of electric vehicle 100. Inverter 102, through the use of a power module 112, may convert DC power from battery 110 in electric vehicle 100 to AC power, to power the drive motor 106 and wheels 108 of electric vehicle 100, for example, but the embodiments are not limited thereto. The inverter 102 may be bidirectional, and may convert DC power to AC power, or convert AC power to DC power, such as during regenerative braking, for example. Inverter 102 may be a single-phase inverter, or a multi-phase inverter, such as a three-phase inverter, for example. The drive motor 106 may include a stator cooling circuit 200*a* and/or a rotor cooling circuit 200*b* as depicted in FIG. 2A and FIG. 2B.

Figure 2A:
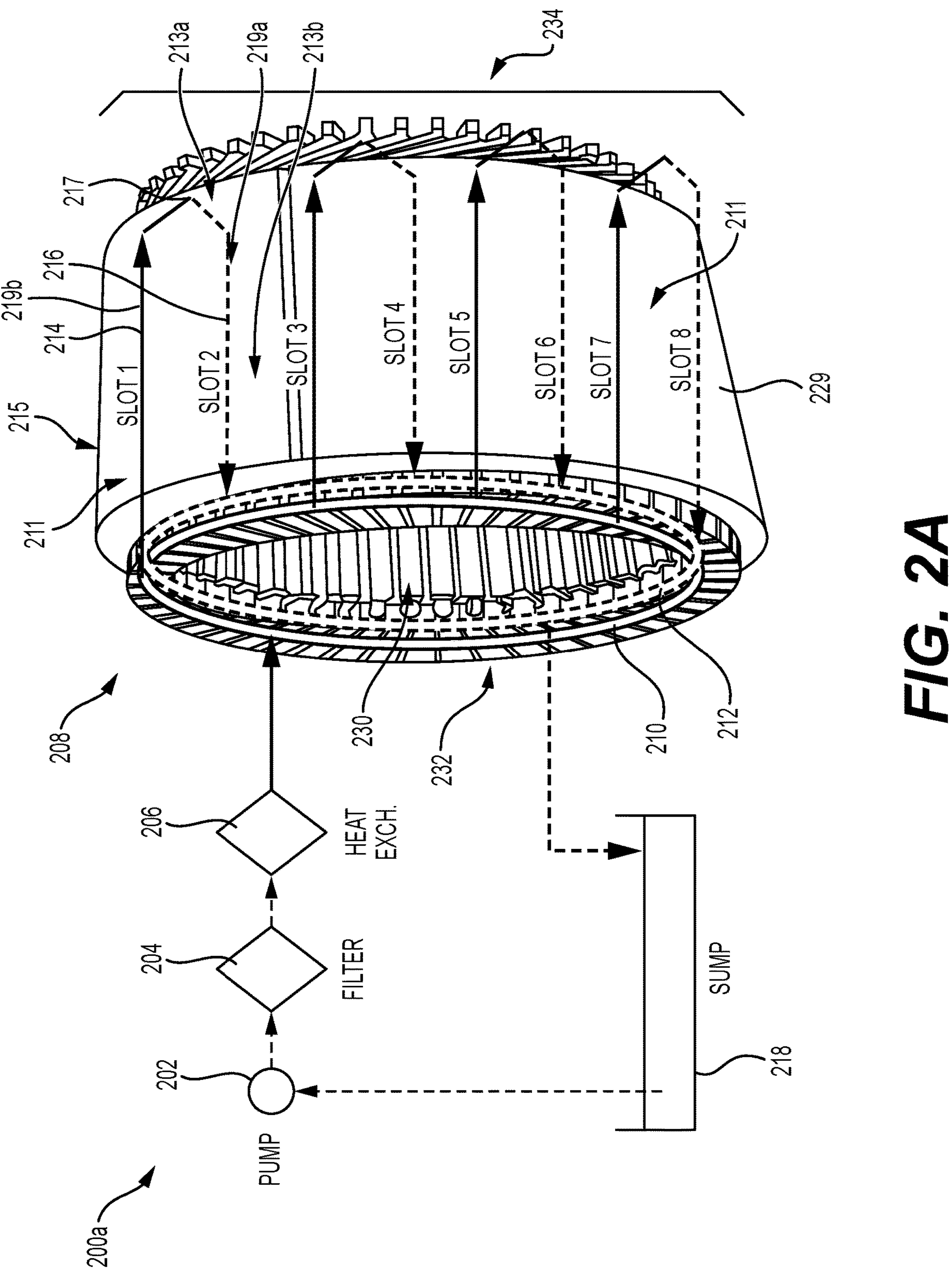
FIG. 2A depicts a cooling circuit including a stator including a hairpin cooling pipe, according to one or more embodiments.
Figure 2B:
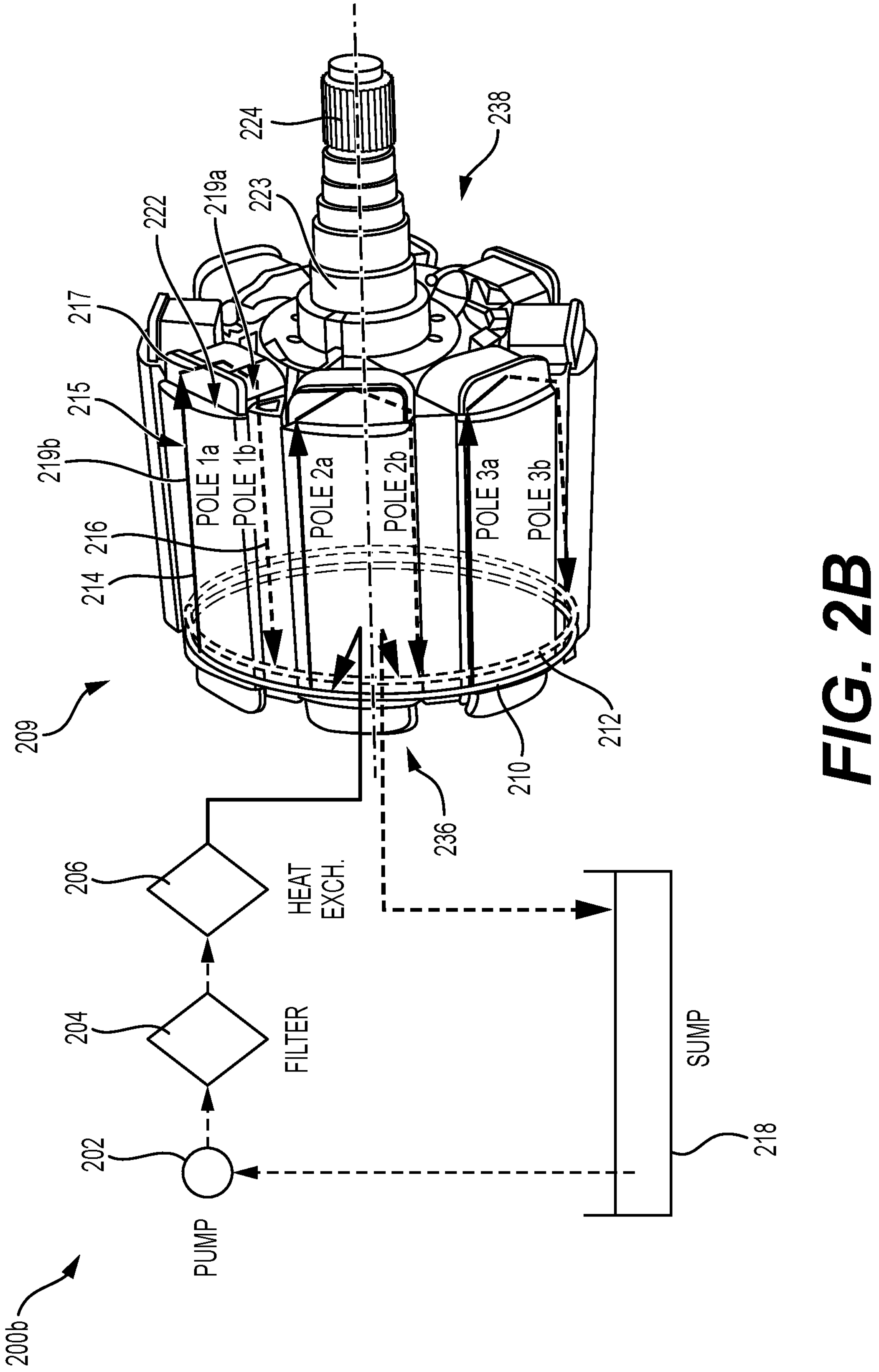
FIG. 2B depicts a cooling circuit including a rotor including a hairpin cooling pipe, according to one or more embodiments.

FIG. 2A depicts a stator cooling circuit 200*a* including a stator 208 and a hairpin cooling pipe 215, according to one or more embodiments. The stator cooling circuit 200*a* may include a pump 202, a filter 204, a heat exchanger 206, a stator 208, and a sump 218. The pump 202 may be configured to transfer coolant through the stator cooling circuit 200*a*. The pump 202 may be in fluid communication with the filter 204. The filter 204 may be configured to filter the coolant flowing within the stator cooling circuit 200*a*.

The filter 204 may be in fluid communication with a heat exchanger 206. The heat exchanger 206 may transfer excess heat from the stator cooling circuit 200*a*. The heat exchanger 206 may be an engine coolant radiator, an oil cooler, or an intercooler, for example. The heat exchanger 206 may be in fluid communication with a stator 208.

The stator 208 may be configured to generate a rotating magnetic field. The stator 208 may include an outer cylinder 229 and a core 211 within the outer cylinder 229. The stator 208 may include a first end 232 and a second end 234 opposite to the first end 232. The stator 208 may include an opening 230 extending from the first end 232 to the second end 234. The opening 230 may be configured to receive a rotor (e.g., the rotor 209 as depicted in FIG. 2B).

Figure 3:
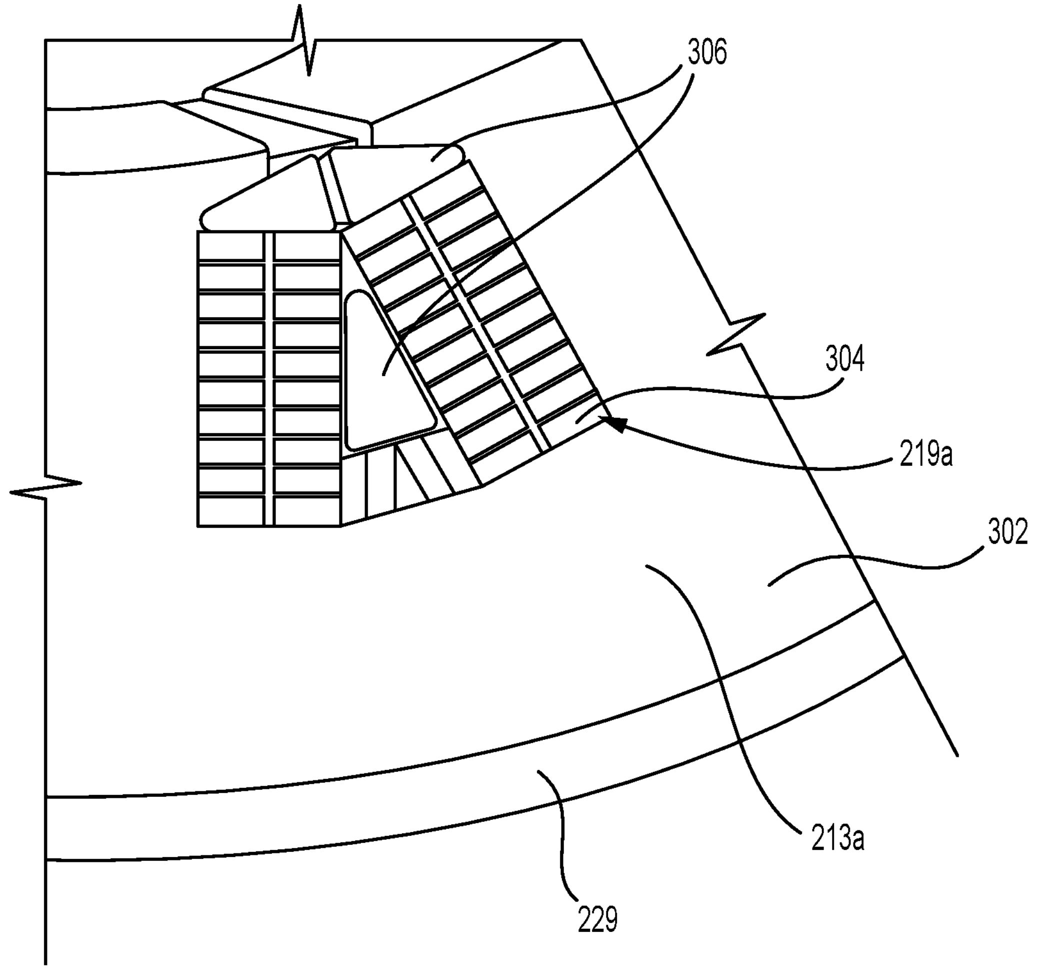
FIG. 3 depicts a cross section of direct winding cooling with a hairpin cooling pipe, according to one or more embodiments.

The stator 208 may include a stack including a set of laminations (e.g., lamination 213*a*, 213*b*, etc.) The set of laminations may include one or more slots (e.g., slot 219*a* and slot 219*b*) in the stack that are configured to receive a hairpin cooling pipe 215 (or hairpin shaped tube 506 of FIG. 5D) and insulated wire/windings (e.g., flattened copper wires 304 as depicted in FIG. 3). The stack (e.g., lamination 213*a*, 213*b*, etc.) may extend from a first end 232 of the stator 208 to the second end 234 of the stator 208. The slots (e.g., slot 219*a* and slot 219*b*) may extend from a first end 232 of the stator 208 to the second end 234 of the stator 208. The slots (e.g., slot 219*a* and slot 219*b*) may extend a portion of an axial length of the core 211.

The hairpin cooling pipe 215 may include a first elongated portion 214, a second elongated portion 216 parallel to the first elongated portion 214, and a U-shaped connector 217 connecting a first end of the first elongated portion 214 to a first end of the second elongated portion 216. The slots may be in parallel with each other. The slots may be configured to receive portions of a hairpin cooling pipe 215. For example, a first elongated portion 214 and a second elongated portion 216 may each be input into a respective slot (e.g., slot 219*a* and slot 219*b*) of the stack (e.g., lamination 213*a*, 213*b*, etc.). The slots (e.g., slot 219*a* and slot 219*b*) may further be depicted in FIG. 5D.

The stator 208 may include an inlet circuit 210 and an outlet circuit 212. The inlet circuit 210 and outlet circuit 212 may each circumferentially extend around a first end 232 of the stator 208. The inlet circuit 210 may be in fluid communication with the heat exchanger 206. The outlet circuit 212 may be in fluid communication with a sump 218, and the sump may be in fluid communication with the pump 202. The stack (e.g., lamination 213*a*, 213*b*, etc.) may include two slots (e.g., slot 219*a* and slot 219*b*). A first slot (e.g., slot 219*a*) of the stack may include a portion of hairpin cooling pipe 215 (e.g., the first elongated portion 214) that may be in fluid communication with the inlet circuit 210. A second slot (e.g., slot 219*b*) of the stack may include a portion of hairpin cooling pipe 215 (e.g., second elongated portion 216) that may be in fluid communication with the outlet circuit 212.

FIG. 2B depicts a rotor cooling circuit 200*b* including a rotor 209 and a hairpin cooling pipe 215, according to one or more embodiments. The stator 208 of FIG. 2A may be configured to receive the rotor 209 within the opening 230 of the stator 208. The rotor cooling circuit 200*b* may include the pump 202, filter 204, heat exchanger 206, rotor 209, and sump 218, all in fluid communication.

The rotor 209 may include a rotor core 223 that extends along a rotor axis 224 and a rotor stack 222 (e.g., one or more rotor laminations) that extends circumferentially from the rotor core 223. The rotor 209 may include a first end 236 and a second end 238 opposite to the first end. The one or more rotor laminations may be stacked from the first end 236 to the second end 238. The rotor stack 222 may include one or more slots (e.g., slot 219*a* and slot 219*b*) configured to receive a hairpin cooling pipe 215 and flattened copper wires 304 as depicted in FIG. 3. The slots of the rotor stack 222 may be arranged and perform the same function as the slots of the stack of the stator 208. The rotor stack 222 may include a set of laminations that are arranged from a first end 236 of the rotor 209 to the second end 238 of the rotor 209. The slots (e.g., slot 219*a* and slot 219*b*) may extend from a first end 236 of the rotor 209 to the second end 238 of the rotor 209. The slots (e.g., slot 219*a* and slot 219*b*) may extend in a direction parallel to the rotor axis 224.

The rotor 209 may include an inlet circuit 210 and an outlet circuit 212. The inlet circuit 210 and outlet circuit 212 may each circumferentially extend around a first end 236 of the rotor 209. The inlet circuit 210 may be in fluid communication with the heat exchanger 206. The outlet circuit 212 may be in fluid communication with a sump 218 and the sump may be in fluid communication with the pump 202.

The rotor stack 222 may include two slots (e.g., slot 219*a* and slot 219*b*). A first slot (e.g., slot 219*a*) of rotor stack 222 may include a portion of hairpin cooling pipe 215 (e.g., the first elongated portion 214) that may be in fluid communication with the inlet circuit 210. A second slot (e.g., slot 219*b*) of the rotor stack 222 may include a portion of hairpin cooling pipe 215 (e.g., second elongated portion 216) that may be in fluid communication with the outlet circuit 212.

FIG. 3 depicts a cross section of direct winding cooling with a hairpin cooling pipe, according to one or more embodiments. The direct winding cooling may be depicted within a stack 302 of a stator (e.g., stator 208). The cross section of a stator 208 may include a cross section of the outer cylinder 229, the stack 302 (e.g., lamination 213*a*, 213*b*, etc.), and the slot 219*a*. The slot 219*a* may include flattened copper wires 304, and cooling channels 306 (e.g., one cooling channel or two cooling channels as depicted in FIG. 3). The cooling channels 306 may be configured to receive an elongated portion of a hairpin cooling pipe 215 or a hairpin shaped tube 506 as described in operation 412 of FIG. 4.

The flattened copper wires 304 may increase the copper filling factor of a motor within a single tooth winding (e.g., stack). The cooling channels 306 may include space for a hairpin cooling pipe 215 or hairpin shaped tube 506 or may be configured to perform direct cooling of the flattened copper wires 304.

Figure 4:
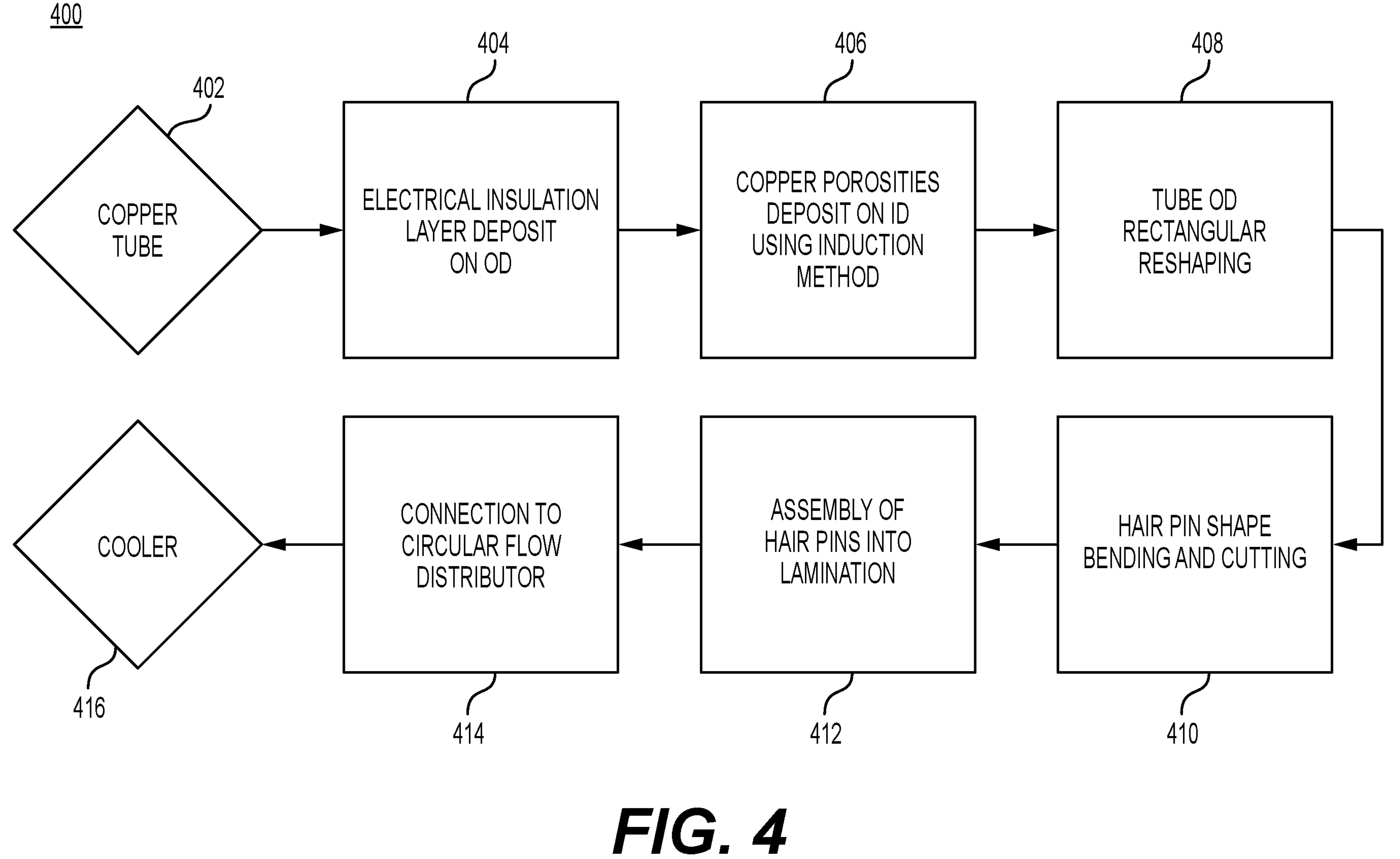
FIG. 4 depicts a flowchart of a manufacturing process for a motor with a hairpin cooling pipe, according to one or more embodiments.

FIG. 4 depicts a flowchart 400 of a manufacturing process for a motor with a hairpin cooling pipe, according to one or more embodiments. At operation 402, a tube may be received. The tube may be aluminum, copper, or steel. The tube may be a flat heat pipe. The tube may be soft, malleable, and easily deformed. The tube may come in various alternative shapes such as a rectangular, square, circular, triangular, pentagonal, or a hexagonal cross section. The tube may be a length including, but not limited to, 0.1 meters, 0.2 meters, 0.5 meters, 1.0 meter, 2.0 meters, etc. The tube may have a diameter of 1 mm, 5 mm, 10 mm, etc. The tube may be rectangular and have a width of approximately 3 mm, a height of approximately 2 mm, and a length of approximately 500 mm. The tube may be square and have a width of approximately 2 mm, a height of approximately 2 mm, and a length of approximately 500 mm.

The dimensions of the received tube may be based on a variety of factors. For example, the factors may include one or more of the electric machine overall packaging requirements, the heat exchange efficiency in regards to the tube diameter and length, the maximum authorized pressure drop per tube, the tube material, or a thickness of the internal layer.

At operation 404, an electrical insulation layer may be deposited on an outer surface of the tube from operation 402. The insulation layer may prevent electrical leakage of the tube when utilized in a motor (e.g., within a stator or rotor).

Figure 5B:
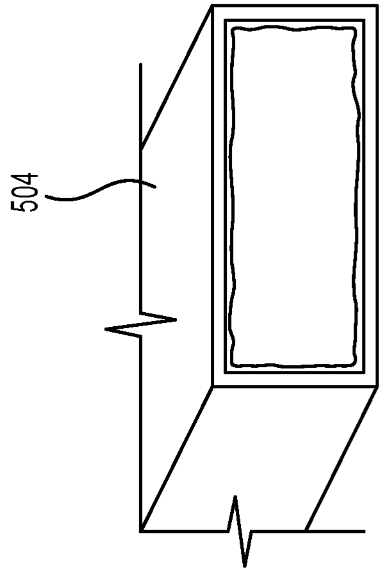
FIG. 5B depicts a porous tube with a rectangular cross section, according to one or more embodiments.
Figure 5A:
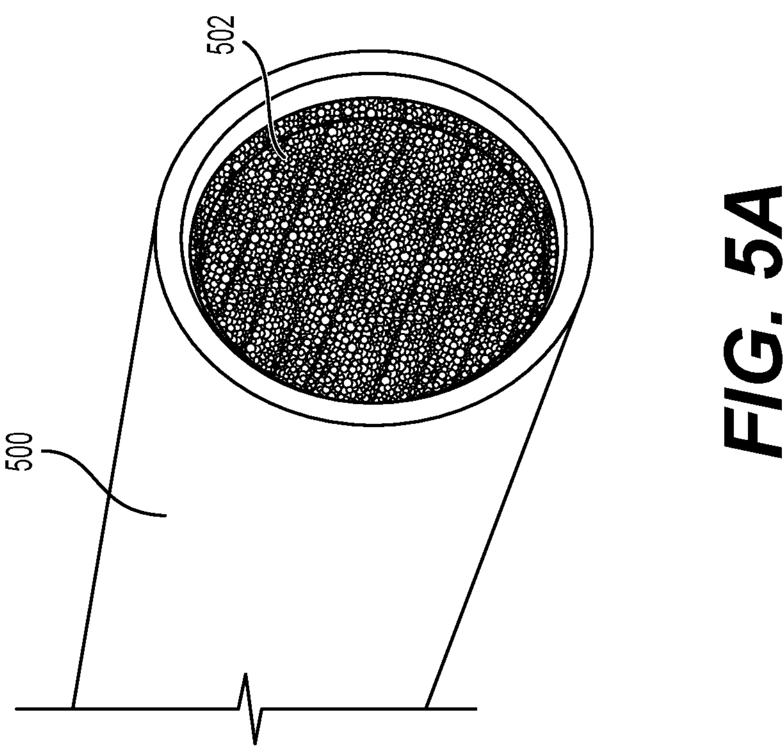
FIG. 5A depicts a porous tube for a hairpin cooling pipe, according to one or more embodiments.

At operation 406, copper porosities deposit may be applied to an inner surface of the tube from operation 404. This may cause the tube to be a porous tube 500 as depicted in FIG. 5A. The porous tube 500 may include a porous layer 502 on the inner surface (i.e., a portion of the inner surface) of the porous tube 500. The porous layer 502 may be formed by a sintering process and/or by an induction method. Operation 404 and operation 406 may increase the cooling capabilities of the porous tube 500.

At operation 408, the porous tube 500 may be reshaped. For example, the porous tube 500 may be reshaped to have a rectangular cross section as depicted in FIG. 5B. The porous tube 500 with a rectangular cross section may be referred to as a rectangular cross-section tube 504.

Figure 5C:
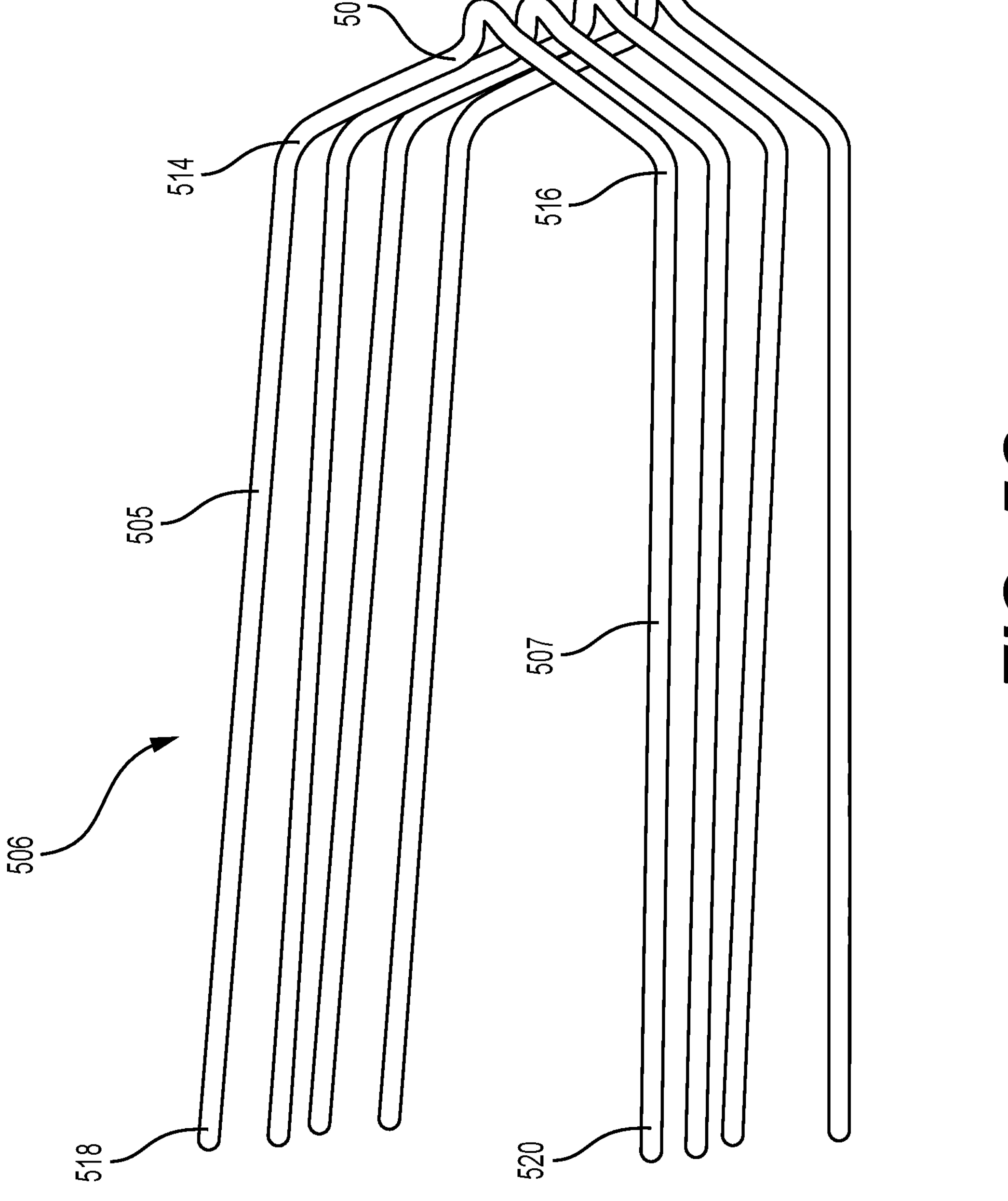
FIG. 5C depicts hairpin cooling pipes, according to one or more embodiments.

At operation 410, the rectangular cross-section tube 504 may be shaped into a hair pin shape by bending and cutting the rectangular cross-section tube 504. After the reshaping, the rectangular cross-section tube 504 may be referred to as a hairpin shaped tube 506. A hairpin shaped tube 506 (e.g., a set of four hairpin shaped tubes) may be depicted in in FIG. 5C. Each hairpin shaped tube 506 may include a first elongated portion 505, a second elongated portion 507 parallel to the first elongated portion 505, and a U-shaped connector 509 connecting a first end 514 of the first elongated portion 505 to a first end 516 of the second elongated portion 507. The second end 518 of the first elongated portion 505 and the second end 520 of the second elongated portion 507 may be configured to be connected to an inlet and/or an outlet circuit. Each hairpin shaped tube 506 may be hollow, and the second end 518 of the first elongated portion 505 may be in fluid connection with the second end 520 of the second elongated portion 507.

Figure 5D:
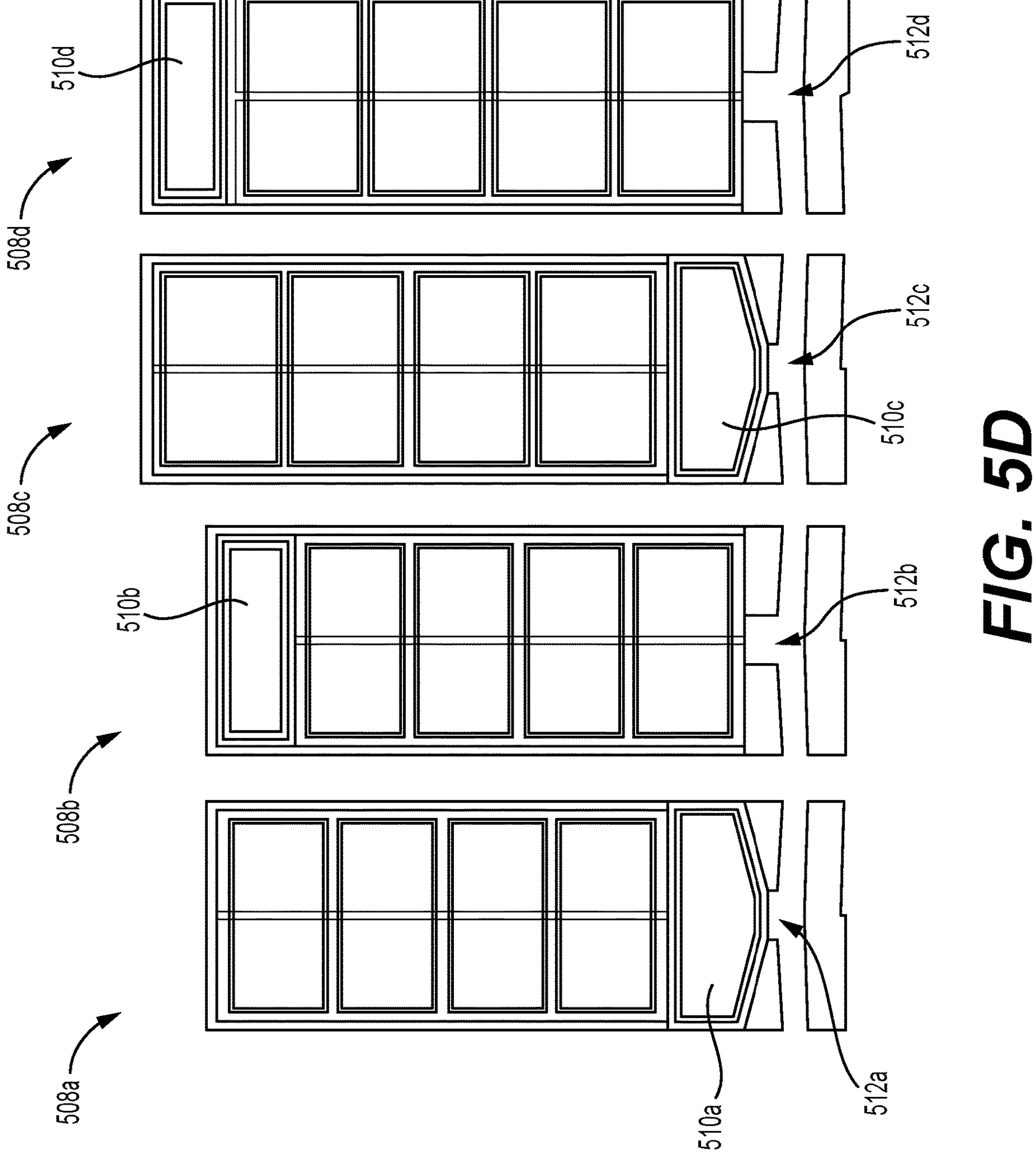
FIG. 5D depicts stator slots with hairpin cooling pipes, according to one or more embodiments.

At operation 412, the hairpin shaped tube 506 may be inserted into a lamination stack of a motor. This may include inserting a particular elongated portion (e.g., either the first elongated portion 505 or the second elongated portion 507) into an opening in a lamination stack. For example, the lamination stack may be lamination stack 508*a*, lamination stack 508*b*, lamination stack 508*c*, or lamination stack 508*d* as depicted in FIG. 5D. For example, each lamination stack (e.g., lamination stack 508*a*, lamination stack 508*b*, lamination stack 508*c*, or lamination stack 508*d*) may have a respective opening (e.g., opening 512*a*, opening 512*b*, opening 512*c*, opening 512*d*) configured to receive an elongated portion of a hairpin shaped tube 506.

The lamination stacks may include a liquid to assist with heat transfer from the stator to the hairpin shaped tube 506. The liquid may be ATF or WEG. The liquid may be located at an end of a stator closest to an opening (e.g., liquid 510*a* in lamination stack 508*a* or liquid 510*c* in a lamination stack 508*c*). The liquid may also be located at an end of a stator furthest from a stator's opening (e.g., liquid 510*b* in lamination stack 508*b* or liquid 510*d* in a lamination stack 508*d*). Operation 412 may be performed during the winding assembly of a stator.

At operation 414, the respective ends (e.g., second end 518 and second end 520) of a hairpin (e.g., hairpin shaped tube 506) may be connected to separate cooling circuits in the respective motor (e.g., stator 208 of FIG. 2A or rotor 209 of FIG. 2B). For example, the second end 518 may be connected with inlet circuit 210 and the second end 520 with outlet circuit 212. These ends may be plugged and sealed into their respective circuits.

At operation 416, the cooling system for the respective motor (e.g., stator 208 of FIG. 2A or rotor 209 of FIG. 2B) may be complete.

The hairpin cooling tube may be configured to directly cool a stator winding from the inside. This interior direct cooling may provide improved cooling for the stator relative to an exterior cooled system. The method described herein may be a quick process that is robust and reproducible. The method may be more efficient as compared to 3D printed heat exchanger for a motor.

One or more embodiments may include a hairpin cooling tube inserted in a slot with a winding of an e-machine to dissipate heat from internal components of a motor (e.g., a stator or a rotor). The winding may further included flattened rectangular wires. The flattened rectangular wires may increase the copper filling factor of a winding in a motor, while the hairpin cooling tube may increase the cooling performance of a motor (and thus increase continuous torque and power output).

One or more embodiments may be configured to increase cooling efficiency by providing a coolant device close to a component that generates heat within the motor (i.e., in the windings of a motor). For example, the heat exchanger (e.g., the hairpin shaped tube) is close to the heat generation component (copper windings), which may provide a motor with a high peak/continuous performance ratio.

One or more embodiments may include a hairpin shaped tube within a slot of a motor. The hairpin shaped tube may include a porous inner surface. The porous inner surface may increase the level of heat exchange performance, by increasing the heat transfer coefficient due to the turbulent flow created within the hairpin shaped tube.

One or more embodiments may include a large heat exchange area within small pipes, enabling the system to be compact. This may lead to lower motor outer diameter compared to some systems. The system described herein may further include a low motor cycle temperature (at a given flow), which may provide better cycle efficiency (due to reduced Copper losses). One or more embodiments may cool a stator and/or rotor. The slots within the motor may further include automatic transmission fluid (ATF) or water-ethylene glycol (WEG) configured to further cool motor windings.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising a rotor including:

a rotor core;

a rotor stack extending circumferentially from the rotor core, the rotor stack including:

a first end;

a second end opposite to the first end;

a first slot in the rotor stack, the first slot extending from the first end to the second end;

flattened copper wires in the first slot;

a first cooling channel and a second cooling channel in the first slot, wherein the first cooling channel and the second cooling channel are proximate to and radially outward of a respective pair of the flattened copper wires;

a hairpin cooling pipe in the first cooling channel and the second cooling channel in the first slot of the rotor stack, wherein the hairpin cooling pipe includes:

a first elongated portion in the first cooling channel;

a second elongated portion parallel to the first elongated portion in the second cooling channel; and a U-shaped connector connecting the first elongated portion to the second elongated portion at the first end of the rotor stack;

an inlet circuit extending circumferentially around the rotor at the first end of the rotor; and an outlet circuit extending circumferentially around the rotor at the first end of the rotor.

2. The system of claim 1, further including:

a second slot extending from the first end of the rotor stack to the second end of the rotor stack.

3. The system of claim 1, wherein the first elongated portion of the hairpin cooling pipe is fluidly connected to the inlet circuit and the second elongated portion of the hairpin cooling pipe is fluidly connected to the outlet circuit.

4. The system of claim 1, further including:

a pump, a filter; and a heat exchanger, wherein the pump, the filter, and the heat exchanger are fluidly connected to the inlet circuit of the rotor stack.

5. The system of claim 1, further including:

a sump, wherein the sump is fluidly connected to the outlet circuit of the rotor stack.

6. The system of claim 1, wherein the rotor stack includes a first lamination and a second lamination, the first slot extends through the first lamination and the second lamination, and the hairpin cooling pipe is provided in the first slot in the first lamination and the second lamination.

7. The system of claim 1, further including:

a stator, wherein the rotor core and the rotor stack are provided inside the stator, wherein the system is provided as a vehicle including the stator, the rotor core, and the rotor stack.

8. The system of claim 1, wherein the hairpin cooling pipe includes a porous inner surface.

9. The system of claim 8, wherein the porous inner surface includes a porous layer formed by a sintering process.

10. The system of claim 1, wherein the hairpin cooling pipe includes an electrical insulation layer on an outer surface of the hairpin cooling pipe.

11. The system of claim 1, wherein the first slot further includes a liquid configured to cool the flattened copper wires, the liquid being one of automatic transmission fluid or water-ethylene glycol.

12. The system of claim 1, wherein the first cooling channel and the second cooling channel are configured to perform direct cooling of the flattened copper wires.

13. The system of claim 1, further including an inverter including a power module, wherein the inverter is configured to convert DC power from a battery to AC power to power a drive motor including the rotor.

14. The system of claim 13, further including the battery, wherein the inverter is bidirectional and is configured to convert AC power to DC power during regenerative braking.

15. The system of claim 1, wherein the rotor core extends along a rotor axis, and the first slot extends in a direction parallel to the rotor axis.

16. The system of claim 1, wherein the hairpin cooling pipe is hollow, and a second end of the first elongated portion is in fluid connection with a second end of the second elongated portion.

17. The system of claim 16, wherein the second end of the first elongated portion is connected to the inlet circuit and the second end of the second elongated portion is connected to the outlet circuit.

* * * * *